United States Patent [19]

Martineau

[11] 4,170,136
[45] Oct. 9, 1979

[54] LEVEL INDICATOR FOR FROZEN CONFECTION DISPENSER

[75] Inventor: Tom M. Martineau, Kiel, Wis.

[73] Assignee: Stoelting, Inc., Kiel, Wis.

[21] Appl. No.: 930,305

[22] Filed: Aug. 2, 1978

[51] Int. Cl.² ............................................. G01F 23/06
[52] U.S. Cl. ........................................ 73/322; 73/307
[58] Field of Search ................. 73/307, 322.5, 319, 73/317, 322; 62/125; 222/51

[56] References Cited

U.S. PATENT DOCUMENTS

| | | | |
|---|---|---|---|
| 1,853,813 | 4/1932 | Horsting | 73/322 |
| 1,908,196 | 5/1933 | Talbot | 73/322 |
| 2,565,423 | 8/1951 | Evans | 73/322 |
| 3,359,799 | 12/1967 | Lubin | 73/322 X |
| 3,498,141 | 3/1970 | Nelson et al. | 73/322.5 X |
| 3,691,839 | 9/1972 | Lasher | 73/322 |
| 3,959,787 | 5/1976 | Messmann et al. | 62/125 X |
| 4,064,828 | 12/1977 | Clark | 62/125 X |

*Primary Examiner*—Daniel M. Yasich
*Attorney, Agent, or Firm*—Joseph P. House, Jr.

[57] ABSTRACT

A tank level indicator having a mounting sleeve and a floating indicator rod slidably mounted in the sleeve. The sleeve has an inner wall from which projects inwardly a series of circumferentially spaced guide pads with gaps therebetween. The pads guide and space the indicator rod with respect to the inner wall. The remainder of the sleeve interior is free of such pads to leave a substantial clearance space between the inner wall of the sleeve and the indicator rod.

6 Claims, 6 Drawing Figures

LEVEL INDICATOR FOR FROZEN CONFECTION DISPENSER

BACKGROUND OF THE INVENTION

Prior art tanks utilize floating indicator rods to indicate tank level. Such rods typically are slidably supported on sleeves mounted in a tank wall. Where the tank contents comprise liquids of relatively high viscosity, for example, ingredients for a soft-serve frozen confection such as ice cream, the indicator rod can carry a film of high viscosity liquid into the sleeve. Such high viscosity liquid can rub off onto the sleeve wall and gum up to clog the space between the rod and the sleeve and inhibit free sliding movement of the rod in the sleeve.

SUMMARY OF THE INVENTION

In accordance with the present invention, such a sleeve is provided on its inner wall with inwardly projecting guide pads with gaps therebetween to guidingly support the rod in spaced relation to the inner wall. Accordingly, even if a film of high viscosity fluid adheres to the rod and is carried up into the sleeve, the clearance between the rod and the sleeve is sufficient to avoid clogging of the clearance space. Moreover, the rod touches only the guide pads which have a very small bearing area of contact with the indicator rod. Accordingly, rod movement keeps the bearing surfaces clean and leaves the rod free to move freely in the sleeve. Any film which gums up on the pads will be stripped off by rod movement and pushed into the clearance gap between the rod and sleeve wall where it cannot interfere with rod movement.

The sleeve is made considerably longer than prior art sleeves for better support of the rod and to maintain vertical orientation of the rod notwithstanding the greater clearance between the rod and the sleeve. The limited contact or bearing areas between the rod and the sleeve reduces the friction drag between the rod and the sleeve and reduces the areas in which gum can build up.

The sleeve is integrally provided with the guide pads at the interior thereof and is also provided at its outer wall with shoulder means for seating the sleeve against the tank wall. Near its upper end, the sleeve is provided with a shoulder or head which interlocks with a removable transparent cap which encloses a space within which the rod moves. Thus, the rod is visible to the observer, but the interior of the tank is sealed from the outer atmosphere to inhibit contamination of tank contents.

Other objects, features, and advantages of the invention will appear from the disclosure hereof.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
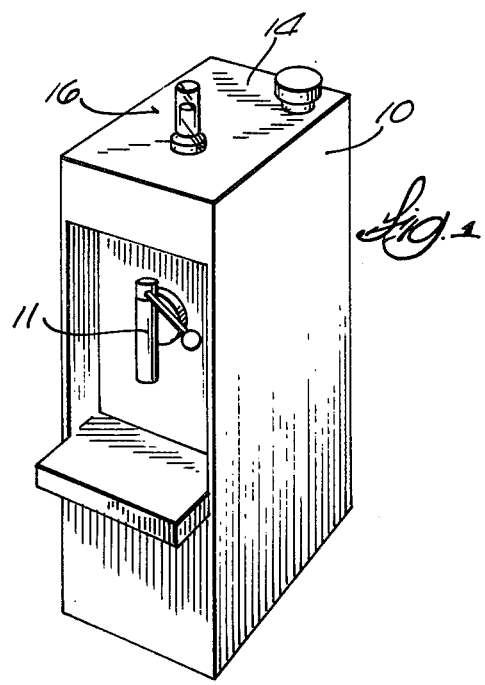
FIG. 1 is a perspective view on a reduced scale of a frozen confection dispenser with a tank level indicator mounted thereon.

The soft-serve or frozen confection freezer 10 of FIG. 1 is shown diagrammatically. It includes a dispensing spout 11 through which the frozen confection is dispensed. Within the upper portion of the dispenser 10 is a tank 12 which contains highly viscous liquid ingredients 13 for the frozen confection which is produced by conventional mechanism inside of the freezer 10. The frozen confection is typically of the consistency of soft-serve ice cream. The upper wall or top 14 of the tank 12 is provided with an opening 15 to receive the level indicator indicated generally by reference character 16.

In accordance with the present invention, the level indicator 16 comprises a mounting sleeve 17 which is seated in the flanged opening 15 in the tank top 14. Sleeve 17 is desirably transparent and is integrally provided with a series of outwardly projecting shoulder means such as shoulder pads 20 which engage frictionally with the flange 15. Slidable within the sleeve 17 is disposed floating indicator rod 21 which typically comprises a hollow tube closed at both ends and having at its top a flanged cap 22 which has a greater diameter than the bore or inner wall 23 of the sleeve 17. Accordingly, there is a substantial clearance space or gap 24 between the rod 21 and the inner wall or bore 23 of sleeve 17.

Figure 2:
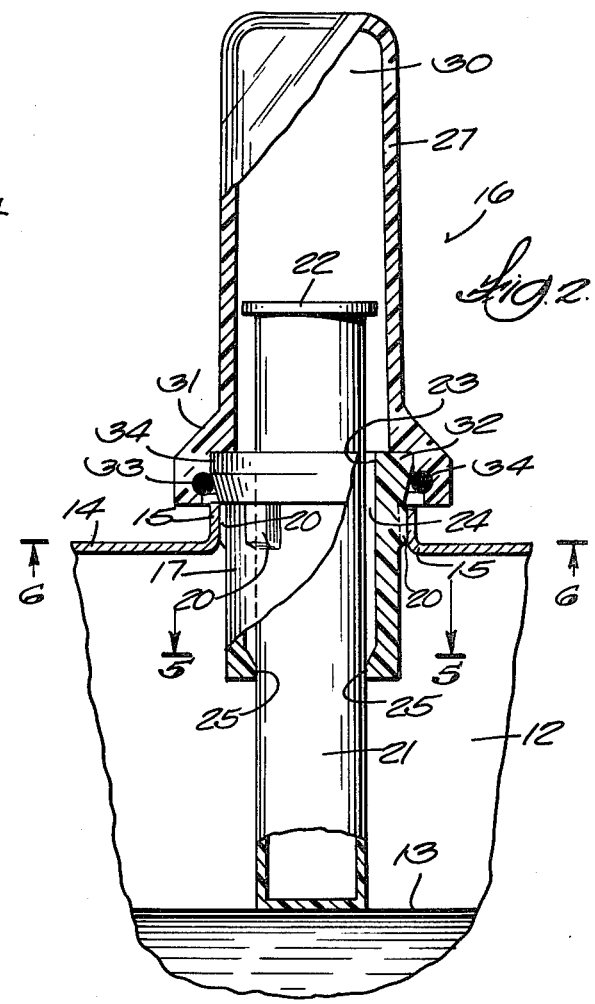
FIG. 2 is an enlarged fragmentary vertical cross section taken through the level indicator and showing its relation to the tank and to the liquid content thereof.
Figure 3:
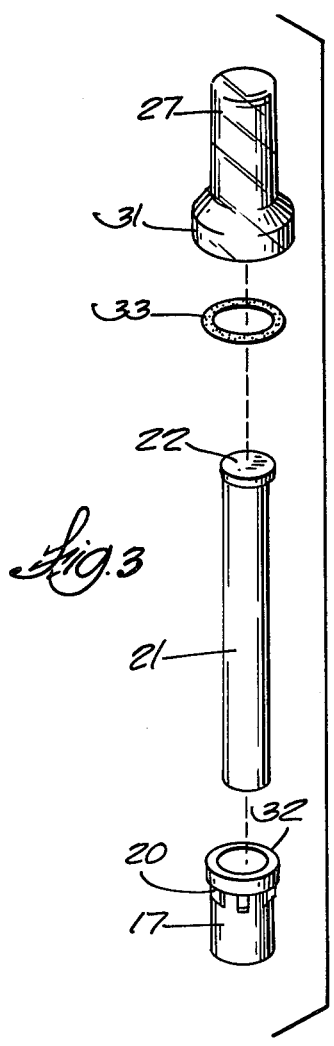
FIG. 3 is an exploded view of the level indicator and its associated parts by which it is mounted on the tank.
Figure 4:
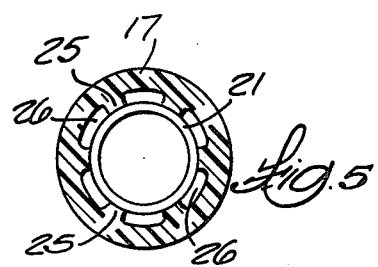
FIG. 4 is a vertical cross section taken through the mounting sleeve.
Figure 5:
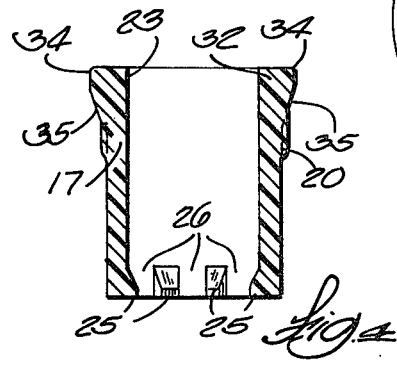
FIG. 5 is a cross section taken along the line 5—5 of FIG. 2.
Figure 6:
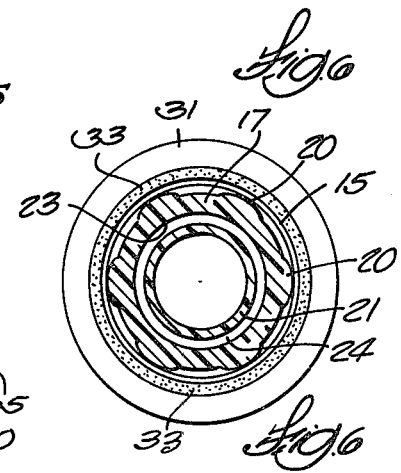
FIG. 6 is a cross section taken along the line 6—6 of FIG. 2.

At its lower end, sleeve 17 is provided integrally with a series of inwardly projecting guide pads 25 which are spaced circumferentially and have gaps 26 therebetween. As best shown in FIGS. 2 and 5, there is sliding or bearing contact between the indicator rod 21 and the guide pads 25, whereby the guide pads 25 will orient the rod 21 vertically and permit it to rise and fall with the changing level of the liquid 13. The guide pads 25 are desirably located only at the lower end of the sleeve 17, the remaining area of the inner wall 23 of the sleeve 17 being free of pads so as to leave a substantial clearance space 24 between the inner wall 23 and the indicator rod 21. Sleeve 17 is relatively long in an axial direction so that the rod 21 cannot tilt very far off of its axis of vertical movement.

Sleeve 17 is also provided with an enclosure comprised of transparent cap 27 which is sealed to the sleeve 17 to enclose the space in which the rod 21 moves and prevent contamination of tank ingredients. The transparent cap 27 permits clear visbility of the indicator rod 21 as it moves vertically inside the cap enclosure 30. The indicator rod 21 is desirably given a distinctive color to make its position readily apparent to the observer.

At its lower end, the cap 27 is provided with a flared shoulder 31 which seats telescopically about a complementary flared shoulder 32 on the sleeve 17. An O-ring 33 is interposed between the complementary shoulders 31, 32 and is seated in a groove 34 formed interiorly on the shoulder 31 of the cap 27. Shoulder 32 of sleeve 17 has a collar 34 of slightly greater diameter than the O-ring 33 and a bevel 35 therebeneath. Accordingly, pressure is required to force the cap into its position shown in FIG. 2 during closure of the cap 27 on sleeve 17, and during the course of which the O-ring 33 is compressed somewhat to pass it around the sleeve collar 34 and into its position shown in FIG. 2 where it bears in sealing engagement against the bevel 35.

Both the sleeve 17 and the cap 27 are desirably made of transparent plastic for good visibility of the indicator rod 21 therethrough.

Rod 21 will typically pick up a film of high viscosity liquid 13 and carry this film up into the sleeve 17 where it tends to gum and clog the bearing surfaces between the rod and the sleeve. However, because the guide pads 25 project inwardly from the inner wall 23 of the sleeve and are of limited area, gumming of the sleeve is minimized and friction between the rod and the sleeve is also reduced to a minimum. Accordingly, even after long service, the rod 21 will freely move in the sleeve to provide an accurate level indication.

The parts are easily cleaned by removing cap 27 from the sleeve 17, thereby making it possible to remove the rod 21 from the sleeve to clean the interior thereof.

I claim:

1. In a tank level indicator having a mounting sleeve and a floating indicator rod freely slidably mounted in the sleeve and in which the indicator rod picks up a film of liquid from the tank and carries it up into the sleeve, the improvement in which said sleeve has an inner wall from which projects inwardly a series of circumferentially spaced guide pads and gaps therebetween to guidingly support the rod in spaced relation to said inner wall for free movement in said sleeve and keep the film of liquid from rubbing onto the sleeve wall.

2. The invention of claim 1 in which said guide pads are disposed near one end of the sleeve, the remainder of the sleeve interior being free of such pads to leave a substantial clearance space between the inner wall of the sleeve and the indicator rod.

3. The invention of claim 1 in which said sleeve has an outer wall with shoulder means for seating said sleeve against the tank wall.

4. The invention of claim 3 in which said shoulder means comprises pads projecting outwardly from the sleeve outer wall.

5. The invention of claim 1 in which said sleeve has an outer wall with a shoulder, a cap forming an enclosure in which the indicator rod moves and sealing means between the cap and the sleeve shoulder.

6. The invention of claim 5 in which said sealing means comprises an O-ring, said sleeve shoulder and cap having surfaces engaged against said O-ring.

* * * * *